United States Patent [19]

Smout et al.

[11] Patent Number: 6,165,924

[45] Date of Patent: *Dec. 26, 2000

[54] UV RADIATION ABSORBING PACKAGE

[75] Inventors: Adrianus Smout, Essen, Belgium; Gerrit Jan Loggers, Heemstede, Netherlands

[73] Assignee: Heineken Technical Services B.V., Amsterdam, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,254

[22] PCT Filed: May 20, 1996

[86] PCT No.: PCT/NL96/00206

§ 371 Date: Jan. 29, 1998

§ 102(e) Date: Jan. 29, 1998

[87] PCT Pub. No.: WO96/36574

PCT Pub. Date: Nov. 21, 1996

[30] Foreign Application Priority Data

May 18, 1995 [NL] Netherlands ............................ 1000397

[51] Int. Cl.[7] ............................. C03C 3/087; C03C 4/00; C03C 4/08

[52] U.S. Cl. ............................. 501/71; 501/70; 501/905; 501/904; 215/400

[58] Field of Search ................................ 501/69, 70, 71, 501/904, 905; 215/365, 400

[56] References Cited

U.S. PATENT DOCUMENTS

| | | |
|---|---|---|
| 2,581,440 | 1/1952 | Pincus ...................................... 501/905 |
| 5,242,869 | 9/1993 | Tarumi et al. ........................... 501/905 |
| 5,268,335 | 12/1993 | Kerko et al. ............................... 501/71 |
| 5,318,931 | 6/1994 | Nakaguchi et al. ....................... 501/70 |
| 5,346,768 | 9/1994 | Winter et al. .............................. 501/71 |
| 5,352,640 | 10/1994 | Combes et al. ......................... 501/905 |
| 5,403,789 | 4/1995 | Kerko et al. . |
| 5,545,596 | 8/1996 | Alvarez Casariego et al. .......... 501/71 |
| 5,837,629 | 11/1998 | Combes et al. . |

FOREIGN PATENT DOCUMENTS 0452207 10/1991 European Pat. Off. .

OTHER PUBLICATIONS

Database WPI, Week 22, Derwent Publications Ltd., London, GB; AN 75–36593, XP002009604 & JP,A,49 098 816 (Asahi Glass KK), Sep. 18, 1974, see abstract.

Chemical Abstracts, vol. 106, No. 6, Feb. 9, 1987, Columbus, Ohio, US; abstract No. 37472, p. 288; XP002009602, see abstract & JP,A,61 151 041 (Matsushita Electric Works Ltd), Jul. 9, 1986.

Glass Industry, vol. 47, No. 5, May 1966, New York US pp. 252–256, XP002009601, R.C. Knupp, et al.: "Effects of Iron in UV–Absorbing Green Glass" cited in the application, see the whole document.

Database WPI, Week 49, Derwent Publications Ltd. GB; AN 71–77787, XP002009603 & SU,A,291 886 (Gusev Branch Glass RES IN), 1971, see abstract (no month).

*Primary Examiner*—Michael Marcheschi
*Attorney, Agent, or Firm*—Pearne & Gordon LLP

[57] ABSTRACT

The invention relates to a package for foods on the basis of green colored, ultraviolet radiation absorbing soda-lime glass that is permeable to visible light and has a dominant wavelength of 500 to 575 nm, which glass, as compared with the weight of the glass, contains at least 1.5% by weight of iron, calculated as $Fe_2O_3$, and at least 0.10% by weight of chromium, calculated as $Cr_2O_3$.

16 Claims, No Drawings

UV RADIATION ABSORBING PACKAGE

This application is a 371 of international application number PCT/NL96/00206, filed May 20, 1996.

The present invention relates to a package for foods that are sensitive to UV radiation. More in particular, the invention relates to a package made of UV absorbing green glass, e.g. a bottle made of UV absorbing green glass that is highly permeable to visible light and has a dominant wavelength of 500 to 575 nm, for packaging foods and beverages.

As is known, ultraviolet radiation, more in particular radiation having a wavelength less than about 400 nm, has a negative effect on the smell and the flavor of foods and beverages, such as beer. This negative effect is ascribed to the chemical reaction of components under the influence of UV radiation.

It has long since been known that it is possible to reduce UV radiation by using glass that contains a number of additives, mostly metal compounds. Until recently, UV radiation absorbing green glass, which is the subject of the present invention, was obtained mainly by including chromium compounds in the glass. EP-A 261 725 describes the manufacture of green, UV radiation absorbing soda-lime glass having an amount of chromium compounds which may be partially replaced by nickel compounds. To obtain sufficient absorption of UV radiation, it is necessary to include relatively large amounts of chromium in the glass, preferably as Cr(VI). According to the examples of the above European patent application it is necessary to include at least 0.7% by weight of chromium in the glass to obtain a reasonable absorption of UV radiation.

From the literature it is already known that green colored glass having absorptivity to IR and UV radiation can be obtained by including iron compounds in glass. This often concerns the manufacture of glass used for windows, e.g. heat- and light-resistant car windows. In general, this concerns a small reduction of the transmission of the radiation, by including a minor amount of iron, mostly in combination with some other additives. Such a material is described in EP-A 452 207. According to this publication, iron, chromium, and cobalt are used to obtain a glass suitable for use in sunroofs of cars.

The amount of iron compounds in such glass compositions is in general below 2.5% by weight, if chromium is also present, more in particular below 1% by weight of the glass composition.

The transmission of UV radiation in such glass compositions is still high, because otherwise the transmission of the visible light is too much inhibited. For this reason the transmission at 380 and 400 nm is still at a level that makes the glass composition unsuitable for use as a protective packaging glass for foods and beverages that are sensitive to UV radiation.

On the other hand, the problem occurs that the transmission to visible light must be at least partially maintained, because the consumer/user must be able to see the contents of the package. Moreover, the wish to obtain a specific color can be at least partially inconsistent with the object of the absorption of UV radiation. If the transmission for IR radiation must be high, this result in the color and/or the absorption of UV radiation being negatively influenced.

Glass Technology, Vol. 26, No. 1, 1985, pp. 60–62, states that in soda-lime glass containing iron and chromium the iron inhibits the formation of hexavalent chromium. This conclusion is also drawn in The Glass Industry, May 1966, pp. 252–256 and 280–281. Hexavalent chromium is particularly responsible for the absorption of UV radiation, so that this will prevent those skilled in the art from using the combination of iron and chromium in soda-lime glass.

It is an object of the invention to provide a package for foods and/or beverages that are sensitive to UV radiation, which package is based on green soda-lime glass. More in particular, it is the object of the invention to provide a package of which the transmission of radiation having a wavelength of <400 nm and more in particular also of 380 nm, at a glass thickness of 2 mm, is nil or negligibly small, while retaining at least part of the transmission of visible light.

The invention is based on the surprising insight that such objects can be attained by using a relatively large amount of iron in combination with the small amounts of chromium, conventional for green glass, in soda-lime glass. The invention therefore relates to a package for foods on the basis of green colored, ultraviolet radiation absorbing soda-lime glass that is permeable to visible light and has a dominant wavelength of 500 to 575 nm, which glass, as compared with the weight of the glass, contains at least 1.5% by weight of iron, calculated as $Fe_2O_3$, and at least 0.10% by weight of chromium, calculated as $Cr_2O_3$.

Surprisingly, it has been found that such a package meets the requirements to be imposed on the UV absorption at wavelengths of 380 to 450 nm, and more in particular of 380 to 400 nm, while yet a good green color is obtained which, moreover, can be adjusted by selecting the conditions in melting, as well as by selecting the other components of the glass batch. Also the degree of absorption at the above wavelengths can be adjusted by these selections, in which connection it should be considered that the total amounts of iron and chromium in the final glass are of great importance to obtaining the right properties with respect to color and UV absorption, or transmission of visible light.

Of importance to obtaining the right proportions of the glass is the ratio between divalent and trivalent iron. This ratio is expressed as $$\frac{Fe(II)}{Fe(II) + Fe(III)}$$

i.e. the amount of divalent iron in relation to the total of iron. Preferably, the amount of divalent iron is as small as possible, i.e. below 0.2. In practice, values below 0.05 are hard to realize. The total amount of iron should not be below about 1.5%, preferably, however, above 2.6% by weight, calculated as $Fe_2O_3$, because otherwise the effect thereof is not obtained to a sufficient degree. On the other hand, no more than about 15, more in particular no more than 10% by weight of iron, calculated as $Fe_2O_3$, need to be used. Larger amounts will lead to problems occurring with the required transmission for visible light.

The amounts of chromium, the ratio of trivalent to hexavalent chromium and the ratio of iron/chromium also influence the properties of the glass, more in particular the absorption of UV radiation. It is assumed, but this is only a hypothesis, that by using a relatively large amount of $Fe_2O_3$ the ratio of trivalent chromium to hexavalent chromium moves a little to hexavalent chromium, which could explain the synergistically increased absorption of UV radiation. The effect, however, does not occur when hexavalent chromium is added only in the presence of the conventional low amounts of iron in the glass.

The package according to the invention is, on the one hand, characterized in that the transmission for radiation of 380 nm at a glass thickness of 2 mm is <5%, more in particular <1%, and at 400 nm <30% more in particular <20% and most preferably <5, or <1%, which in practice means that the package completely or nearly completely absorbs the UV radiation, while, on the other hand, the visible light is transmitted for the major part and the color of the glass is green. The latter means that the dominant wavelength of the glass is between 500 and 575 nm, more in particular between 550 and 565 nm. Of course, it is also possible to define the color by means of the CIE-Lab system. Starting from a measurement at transparent colored glass having a thickness of 2 mm, against a white background with L*=98.89, a*=−0.06 and b*=0.02, with D65 light at an observation angle of 2°, with a BYK-Gardner spectrometer, type Spectrogard Automatch Color System TCM 8800, under standard CIE-lab conditions the color can be defined as follows: L*=0–80, a*=0−−35, and b*=−10−+55.

The package according to the invention is based on soda-lime glass, which has the advantage that its costs remain low. This may be of special importance to glass for single use which is recycled again. The components of such soda-lime glass compositions are known to those skilled in the art.

Although it is known that a large number of metal oxides influence the color and absorption of the glass, it is preferred according to the invention to use substantially no vanadium, nickel and cobalt; as already indicated, this is important both from the viewpoint of costs and from environmental considerations. Certainly if the package must be suitable for single use, the absence of such metals is of great importance. Moreover, the glass must not contain arsenic and tin, since these substances are undesirable in the glass because of their environmental effects.

Depending on the specific use and the desired color, it is possible to use a minor proportion of nickel, if required. Amounts of nickel of 0.01 to 0.1% by weight have an absorption-increasing effect for the transmission of light at different wavelengths. To obtain similar effects, an amount (0.1 to 5% by weight) of titanium oxide, zirconium oxide or copper(II) oxide may also be used, if required.

The maximum amount of chromium in the glass may also be kept at low values, corresponding to the amounts now conventional for green glass that is not UV-absorbing. A suitable upper limit for the amount of chromium, calculated as $Cr_2O_3$, is 0.5% by weight, more in particular 0.35% by weight.

In this connection it is observed that although in regard to the present invention reference is made to the use of metals, the final glass will contain these metals in the form of compounds thereof, substantially oxides.

The glass used according to the invention for the package should have an emerald green color, which means that the dominant wavelength ranges between 500 and 575 nm, more in particular between 550 and 565 nm. It is also UV radiation absorbing. An optimum combination of these two properties is reached if 2.5 to 3.5% by weight of iron is combined with 0.10 to 0.35% by weight of chromium.

In general, it is preferred that the glass comprises 1.5–10% by weight of iron, calculated as $Fe_2O_3$ 0.10–0.5% by weight, preferably 0.15–0.5% by weight of chromium, calculated as $Cr_2O_3$ 50–85% by weight of $SiO_2$ 5–25% by weight, preferably 5–12% by weight of alkali metal oxide 5–25% by weight of alkaline earth metal oxide 0–5% by weight, preferably 0–4% by weight of aluminium oxide 0–5% by weight of traces.

The amount of iron preferably ranges between 2.6 and 8% by weight. As trace components, different additives influencing the properties (color, ratio of Fe(II)/Fe(III), melting properties etc.) can be used. Examples of such components are compounds of manganese, titanium, zirconium or carbon. Excluded, however, are coloring, heavy and toxic metals.

The package is manufactured in the manner conventional for the making of glass, by melting the components in a furnace, under such conditions that the desired degree of oxidation of the iron is reached. According to the present invention the degree of air supply during melting proves to be important. By control thereof, the ratio of di- and trivalent iron can also be influenced. In general, it is preferred that no reducing conditions are used. Slightly oxidizing conditions are preferred.

Starting products for the glass are the conventional materials, of which in practice a (major) portion is formed by recycle glass (cullet). Assorted green glass can thus be used in amounts up to even more than 80% by weight of the starting products.

The package is suitable for contact with foods and beverages, such as soft drinks, alcoholic beverages and fruit juices. More in particular, the package is suitable as a beer bottle, since beer has the property of strongly deteriorating when exposed to UV radiation.

The invention will be explained with reference to the following examples.

EXAMPLES

Soda-lime glass was made by melting in the air at a temperature of 1450° C. The composition of the batch was in parts by weight:

| | | |
|---|---|---|
| 74.5 parts | sand | |
| 24.5 parts | sodium carbonate | |
| 0.5 parts | sodium sulfate | |
| 20.0 parts | calcium carbonate | |
| 3.1 parts | aluminium hydroxide | |
| | chromium as $Cr_2O_3$ in an amount giving 0.24% by weight of chromium as $Cr_2O_3$ | |
| | iron as $Fe_2O_3$ in variable amounts. | |

This leads to the following basic glass composition:

| | |
|---|---|
| $SiC_2$ | 73% by weight |
| $Na_2O$ | 14% by weight |
| CaO | 11% by weight |
| $Al_2O_3$ | 2% by weight |
| $Cr_2O_3$ | 0.24% by weight |
| $Fe_2O_3$ | in variable amounts |

In the following table the transmission (T) at 380, 400, 500 and 600 nm, as well as the color, given as a function of the amount of iron.

| % $Fe_2O_3$ | % $T_{380}$ | % $T_{400}$ | % $T_{500}$ | % $T_{600}$ | L* | a* | b* |
|---|---|---|---|---|---|---|---|
| 0 | 71 | 71 | 56 | 60 | 73 | −36 | 36 |
| 1 | 36 | 50 | 55 | 54 | 68 | −37 | 40 |
| 3 | 12 | 30 | 47 | 48 | 61 | −34 | 43 |
| 3 | 3 | 14 | 32 | 36 | 49 | −28 | 41 |
| 4 | 0 | 5 | 25 | 30 | 38 | −22 | 44 |
| 5 | 0 | 2 | 18 | 23 | 28 | −15 | 37 |

What is claimed is:

1. A beverage bottle comprising green colored, ultraviolet radiation absorbing soda-lime glass that is permeable to visible light and has a dominant transmission wavelength of 500 to 575 nm, said glass containing at least 1.5% by weight but not more than 15% by weight of iron, calculated as $Fe_2O_3$, and at least 0.10% by weight of chromium, calculated as $Cr_2O_3$, said glass being essentially free of nickel, cobalt, vanadium, arsenic and tin, said glass having a ratio of $$\frac{Fe(II)}{Fe(II) + Fe(III)}$$

below 0.2, said glass at a thickness of 2 mm having a transmission for radiation at 380 nm of <5%.

2. A beverage bottle according to claim 1, wherein the amount of chromium, calculated as $Cr_2O_3$, is no more than 0.5% by weight.

3. A beverage bottle according to claim 1, wherein the glass at a thickness of 2 mm has a transmission for radiation at 400 nm of <20%.

4. A beverage bottle according to claim 1, wherein the content of iron, calculated as $Fe_2O_3$, is no more than 8% by weight.

5. A beverage bottle according to claim 1, wherein the content of iron, calculated as $Fe_2O_3$, is more than 2.6% by weight.

6. A beverage bottle according to claim 1, wherein the glass further comprises 0.1 to 5% by weight of titanium and/or zirconium, calculated as oxide.

7. A beverage bottle according to claim 1, wherein the glass further comprises 0.1 to 5% by weight of copper, calculated as copper(II) oxide.

8. A beverage bottle according to claim 1, wherein the glass consists essentially of 1.5–10% by weight of iron, calculated as $Fe_2O_3$ 0.10–0.5% by weight of chromium, calculated as $Cr_2O_3$ 50–85% by weight of $SiO_2$, 5–25% by weight of alkali metal oxide, 5–25% by weight of alkaline earth metal oxide, and 0–5% by weight of aluminum oxide.

9. A beverage bottle according to claim 1, wherein the glass consists essentially of 2.5–3.5% by weight of iron, calculated as $Fe_2O_3$ 0.10–0.35% by weight of chromium, calculated as $Cr_2O_3$ 50–85% by weight of $SiO_2$ 5–12% by weight of alkali metal oxide 5–25% by weight of alkaline earth metal oxide 0–4% by weight of aluminum oxide, and 0.1–5% by weight of titanium dioxide or copper(II) oxide.

10. A beverage bottle according to claim 1, wherein said glass has a dominant transmission wavelength of 550 to 565 nm.

11. A beverage bottle according to claim 1, wherein the amount of chromium, calculated as $Cr_2O_3$, is no more than 0.35% by weight.

12. A beverage bottle according to claim 1, wherein the glass at a thickness of 2 mm has a transmission for radiation at 380 nm of <1%.

13. A beverage bottle according to claim 1, wherein the glass at a thickness of 2 mm has a transmission for radiation at 400 nm of <5%.

14. A beverage bottle according to claim 1, wherein the content of iron, calculated as $Fe_2O_3$, is more than 2.75% by weight.

15. A beverage bottle according to claim 1, wherein said beverage bottle is a beer bottle.

16. A beverage bottle according to claim 1, wherein said beverage bottle is a beer bottle containing beer.

* * * * *

UNITED STATES PATENT AND TRADEMARK OFFICE
CERTIFICATE OF CORRECTION

PATENT NO. : 6,165,924
DATED : December 26, 2000
INVENTOR(S) : Adrianus Smout et al.

It is certified that error appears in the above-indentified patent and that said Letters Patent is hereby corrected as shown below:

Column 4, line 48, delete "$SiC_2$" and insert therefor --$SiO_2$--.

Signed and Sealed this

Twenty-ninth Day of May, 2001

Attest:

NICHOLAS P. GODICI

*Attesting Officer*  *Acting Director of the United States Patent and Trademark Office*